United States Patent
Ogawa

(10) Patent No.: US 8,550,135 B2
(45) Date of Patent: Oct. 8, 2013

(54) PNEUMATIC TIRE

(75) Inventor: Yukihiro Ogawa, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 538 days.

(21) Appl. No.: 12/739,355

(22) PCT Filed: Oct. 22, 2008

(86) PCT No.: PCT/JP2008/069140
§ 371 (c)(1),
(2), (4) Date: Apr. 22, 2010

(87) PCT Pub. No.: WO2009/054408
PCT Pub. Date: Apr. 30, 2009

(65) Prior Publication Data
US 2010/0258225 A1    Oct. 14, 2010

(30) Foreign Application Priority Data

Oct. 23, 2007 (JP) ................................ 2007-275016

(51) Int. Cl.
*B60C 9/28* (2006.01)
(52) U.S. Cl.
USPC ........................................ 152/532; 152/538
(58) Field of Classification Search
USPC ........................................ 152/532, 526, 538
IPC ....................................................... B60C 9/28
See application file for complete search history.

(56) References Cited

U.S. PATENT DOCUMENTS

| 5,131,446 A | 7/1992 | Fukumoto et al. |
| 5,151,139 A * | 9/1992 | Takada .......................... 152/454 |
| 5,503,205 A * | 4/1996 | Aoki et al. ............... 152/209.14 |
| 6,131,632 A | 10/2000 | Fukumoto et al. |
| 6,460,584 B1 | 10/2002 | De Labareyre |
| 6,880,599 B2 | 4/2005 | Maruoka et al. |
| 7,575,031 B2 | 8/2009 | Manno et al. |

(Continued)

FOREIGN PATENT DOCUMENTS

| EP | 1 787 825 A1 | 5/2007 |
| JP | 1-141104 A | 6/1989 |

(Continued)

OTHER PUBLICATIONS

English language machine translation of JP2004-268809, 2004.*

*Primary Examiner* — Justin Fischer
*Assistant Examiner* — Philip N Schwartz
(74) *Attorney, Agent, or Firm* — Carrier Blackman & Associates, P.C.; Joseph P. Carrier; William D. Blackman

(57) ABSTRACT

A pneumatic tire includes at least three belts arranged on a tire-radial-direction outer side of a carcass and a belt edge cushion arranged between a tire-width-direction outer end portion of a second belt that is secondly arranged from the tire-radial-direction outer side and a tire-width-direction outer end portion of a third belt that is thirdly arranged. The second belt is curved to a tire-radial-direction inner side in an area of the belt edge cushion in a tire width direction. A tire-width direction outer end of a first belt that is firstly arranged from the tire-radial-direction outer side is provided in a position close to a tire-width-direction inner end of the belt edge cushion in the tire width direction.

8 Claims, 3 Drawing Sheets

(56) References Cited

U.S. PATENT DOCUMENTS

| | | |
|---|---|---|
| 7,677,287 B2 | 3/2010 | Manno et al. |
| 2004/0221936 A1 * | 11/2004 | Kaiser et al. ............... 152/209.1 |
| 2009/0084485 A1 | 4/2009 | Netzer et al. |
| 2009/0114330 A1 * | 5/2009 | Netzer et al. ................... 152/527 |
| 2009/0272477 A1 | 11/2009 | Coue et al. |

FOREIGN PATENT DOCUMENTS

| | | |
|---|---|---|
| JP | 11-222008 A | 8/1999 |
| JP | 2000-318410 A | 11/2000 |
| JP | 2002-254903 A | 9/2002 |
| JP | 2004-268809 A | 9/2004 |
| JP | 2004-359030 A | 12/2004 |
| JP | 2005-313837 A | 11/2005 |
| JP | 2007-137384 A | 6/2007 |
| JP | 2007-196866 A | 8/2007 |
| WO | 03/051651 A1 | 6/2003 |
| WO | 2007/003550 A1 | 1/2007 |
| WO | 2007/003562 A1 | 1/2007 |
| WO | WO 2007003557 A1 * | 1/2007 |

* cited by examiner

FIG.3

| | DEFINED RANGE | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 | EXAMPLE 14 |
|---|---|---|---|---|---|---|---|---|---|---|---|---|---|---|---|---|
| Trb/Tra | 0.03-0.20 | - | 0.03 | 0.03 | 0.03 | 0.03 | 0.20 | 0.20 | 0.20 | 0.20 | 0.01 | 0.30 | 0.20 | 0.20 | 0.20 | 0.20 |
| Wd/WB in W1 | 0-0.30 | 0.45 | 0 | 0 | 0.30 | 0.30 | 0 | 0 | 0.30 | - | 0 | 0 | 0.45 | - | 0 | 0 |
| Wd/WB in W2 | 0-0.30 | - | 0 | 0 | - | - | 0 | 0 | - | 0.30 | 0 | 0 | - | 0.45 | 0 | 0 |
| Wbs/Wt | 0.87-0.94 | 0.81 | 0.87 | 0.94 | 0.87 | 0.87 | 0.87 | 0.94 | 0.87 | 0.94 | 0.87 | 0.94 | 0.87 | 0.94 | 0.83 | 0.98 |
| Wbb/Wt | 0.93-1.00 | 0.92 | 0.93 | 1.00 | 0.93 | 0.93 | 0.93 | 1.00 | 0.93 | 1.00 | 0.93 | 1.00 | 0.93 | 1.00 | 0.90 | 1.04 |
| Gc/Ga | 0.90-1.10 | 0.85 | 0.90 | 0.90 | 0.90 | 1.10 | 0.90 | 1.10 | 0.90 | 1.10 | 0.90 | 1.10 | 0.90 | 1.10 | 0.85 | 1.13 |
| Gb/Gc | 0.90-0.97 | 1.05 | 0.90 | 0.90 | 0.90 | 0.97 | 0.90 | 0.97 | 0.90 | 0.97 | 0.90 | 0.97 | 0.90 | 0.97 | 0.87 | 1.00 |
| Sh SHOULDER WEAR RESISTANCE | | 100 | 107 | 108 | 106 | 106 | 106 | 106 | 105 | 106 | 102 | 102 | 101 | 102 | 103 | 104 |
| CENTER WEAR RESISTANCE | | 100 | 100 | 100 | 100 | 100 | 100 | 100 | 100 | 100 | 100 | 100 | 100 | 99 | 99 | 100 |
| BELT-EDGE-SEPARATION RESISTANCE | | 100 | 100 | 100 | 100 | 100 | 100 | 100 | 100 | 100 | 99 | 98 | 98 | 99 | 100 | 98 |

PNEUMATIC TIRE

TECHNICAL FIELD

The present invention relates to a pneumatic tire, and more specifically to a pneumatic tire that can improve uneven wear resistance.

BACKGROUND ART

There is a problem in pneumatic tires, mostly in heavy-duty pneumatic tires, that uneven wear occurs in a rib portion (a shoulder area) which is on an outer side of the tread in a tire-width direction when a tire is mounted on a steering shaft. The uneven wear in the rib portion includes step wear that causes a step to be formed at a circumferentially-arranged main groove and edge wear that occurs in an outer edge portion due to toe-in, camber, or a slope road surface. Uneven wear in a rib portion may cause a trouble in operation.

In one conventional pneumatic tire, dimensions are set to appropriate values to obtain uneven wear resistance. The pneumatic tire includes a belt layer, and the belt layer includes a first belt on the carcass side and a second belt on the outer side of the first belt. Provided that a tread thickness between the outline of the tread surface and the second belt is T and a tread thickness between the outline of the tread surface and a carcass is K, ratios Tmin/Tc, Tb/Tc, Kmin/Kc, and Kb/Kc are appropriately set: wherein Tmin is a minimum value of the tread thickness T in an area Y that is 0.5 to 0.7 of a half of a ground contact width of the tread, i.e., a width from the tire equator (the distance between the end of a ground contact surface of the tread and the tire equator), Tc is a tread thickness T at the position of the tire equator, Tb is a tread thickness T at the position of the outer edge of the second belt, Kmin is a minimum value of the tread thickness K in the area Y, Kc is a tread thickness K at the position of the tire equator, and Kb is a tread thickness K at the position of the outer edge of the second belt (see, for example, Patent Document 1).

Another conventional pneumatic tire is configured as follows to obtain uneven wear resistance. The pneumatic tire includes one or more belt reinforcing layer that is positioned to the side of an outer circumference of the crown portion of a carcass, a belt that is positioned on an outer side of the belt reinforcing layer in a radial direction of the tire and includes two or more cross belts whose cords cross with each other across the tire equatorial plane, and a tread. The cords of the cross belts are oblique to the tire equatorial plane by 10 to 35 degrees. The belt reinforcing layer is provided in an area having a width narrower than that of the belt in a tire-width-direction cross section and covering a position right under a circumferential direction groove arranged in a shoulder portion (see, for example, Patent Document 2).

Patent Document 1: WO2003/051651
Patent Document 2: Japanese Patent Application Laid-open No. 2004-359030

DISCLOSURE OF INVENTION

Problem to be Solved by the Invention

In the pneumatic tire of Patent Document 1, a third belt is provided on the outer side of a second belt, and furthermore, a fourth belt is provided on the outer side of the third belt. A space is provided between tire-width-direction end portions of the second belt and the third belt, which are positioned in a shoulder area of the tread, and a step is formed between a tire-width-direction end portion of the fourth belt and the outer surface of the third belt. In contrast, in the pneumatic tire of Patent Document 2, a belt layer is additionally provided on the tire-radial-direction outer side of the two cross belt layers. A space is provided between tire-width-direction end portions of the two cross belt layers positioned in the shoulder area, and a step is formed between the tire-width-direction end portion of the belt layer on the tire-radial-direction outer side and the outer surface of the cross belt layer. In other words, in the conventional pneumatic tires, the thickness of the tread is uneven with respect to the outermost belt in the tire radial direction. The unevenness is one of the causes of occurrence of uneven wear in the shoulder area. Therefore, in the conventional pneumatic tires, it is difficult to further improve the uneven wear resistance in the shoulder area of the tread. Furthermore, unevenness in the thickness of the tread results in unevenness in the rigidity of the tread in the tire width direction.

The present invention has been made in view of the above circumstance, and an object of the present invention is to provide a pneumatic tire that can further improve the uneven wear resistance in a shoulder area of a tread and equalize the rigidity of the tread in the tire width direction.

Means for Solving Problem

According to one aspect of the invention, in a pneumatic tire in which a belt including at least three layers is arranged on a tire-radial-direction outer side of a carcass, a belt edge cushion is provided between a tire-width-direction outer end portion of a second belt that is secondly arranged from the tire-radial-direction outer side and a tire-width-direction outer end portion of a third belt that is thirdly arranged, the second belt is curved to a tire-radial-direction inner side in an area of the belt edge cushion in a tire width direction, and a tire-width direction outer end of a first belt that is firstly arranged from the tire-radial-direction outer side is provided in a position close to a tire-width-direction inner end of the belt edge cushion in the tire width direction.

In the pneumatic tire, because the second belt is curved to the tire-width-direction inner side in the area of the belt edge cushion in the tire width direction and the tire-width-direction outer end of the first belt that is firstly arranged from the tire-radial-direction outer side is provided in a position close to the tire-width-direction inner end of the belt edge cushion in the tire width direction, the surface from the tire-radial-direction outer surface of the first belt to the tire-radial-direction outer surface of the second belt is aligned, so that the thickness of the tread in the tire radial direction is equalized. Thus, the contact pressure of the tread is equalized so that the uneven wear resistance in the shoulder area can be improved and the rigidity of the tread in the tire width direction is equalized. This improves the durability of the pneumatic tire and stability in steering in the case where the pneumatic tire is mounted on the steering shaft.

In the pneumatic tire, a curvature radius Trb of a portion of the second belt, which portion curves to the tire-radial-direction inner side, and a curvature radius Tra of the first belt may have a relationship of $0.03 \leq Trb/Tra \leq 0.20$.

In the pneumatic tire, the thickness of the tread in the tire radial direction can be further equalized.

In the pneumatic tire, a tire-width direction distance Wd between the tire-width direction outer end of the first belt and the tire-width direction inner end of the belt edge cushion may be in a range of $0 \leq Wd/WB \leq 0.30$ of a width direction WB of the belt edge cushion.

In the pneumatic tire, by appropriately setting Wd/WB, the thickness of the tread in the tire radial direction in the shoulder area can be equalized.

In the pneumatic tire, provided that a tire equator position is Ga, a tire-width direction outer end position of the first belt is Gb, and a tire-width-direction outer end position of the second belt is Gc, a tire-radial-direction dimension of the tread may be set in a range of $0.90 \leq Gc/Ga \leq 1.10$ and a range of $0.90 \leq Gb/Gc \leq 0.97$.

According to the pneumatic tire, the thickness of the tread in the tire radial direction from the tire equatorial line of the tread to the shoulder area can be further equalized.

In the pneumatic tire, a tire-width-direction dimension Wbs of the second belt and a tire-width-direction dimension Wt of the tread may have a relationship of $0.87 \leq Wbs/Wt \leq 0.94$, and a tire-width-direction dimension Wbb of the third belt and a tire-width-direction dimension Wt of the tread may have a relationship of $0.93 \leq Wbb/Wt \leq 1.00$.

In the pneumatic tire, by setting Wbs and Wbb larger than Wt as much as possible, molding of the belt edge cushion is improved and the effective width of the belt acting on the shoulder can be sufficiently assured.

In the pneumatic tire, protrusions that protrude to the tire-width-direction outer side may be provided in portions that are buttress portions positioned on both of tire-width direction ends of the tread, and to which at least tire-width-direction outer ends of the third belt may direct.

In the pneumatic tire, provision of the protrusion on the buttress portion increases the thickness of the rubber member in the buttress portion so that the belt can be prevented from being exposed at the time of buffing (cutting) during remolding of the tire.

Effect of the Invention

In the pneumatic tire according to the present invention, an aligned plane is achieved from the tire-radial-direction outer surface of the first belt to the tire-radial-direction outer surface of the second belt, so that the thickness of the tread in the tire radial direction is equalized. Accordingly, the contact pressure of the tread is equalized so that the uneven wear resistance in the shoulder area can be improved and the rigidity of the tread in the tire width direction can be equalized. This improves the durability of the pneumatic tire and the stability in steering in the case where a pneumatic tire 1 is mounted on the steering shaft.

BRIEF DESCRIPTION OF DRAWINGS

FIG. 3 is a table representing results of performance tests on pneumatic tires of examples of the present invention.

EXPLANATIONS OF LETTERS OR NUMERALS

Figure 1:
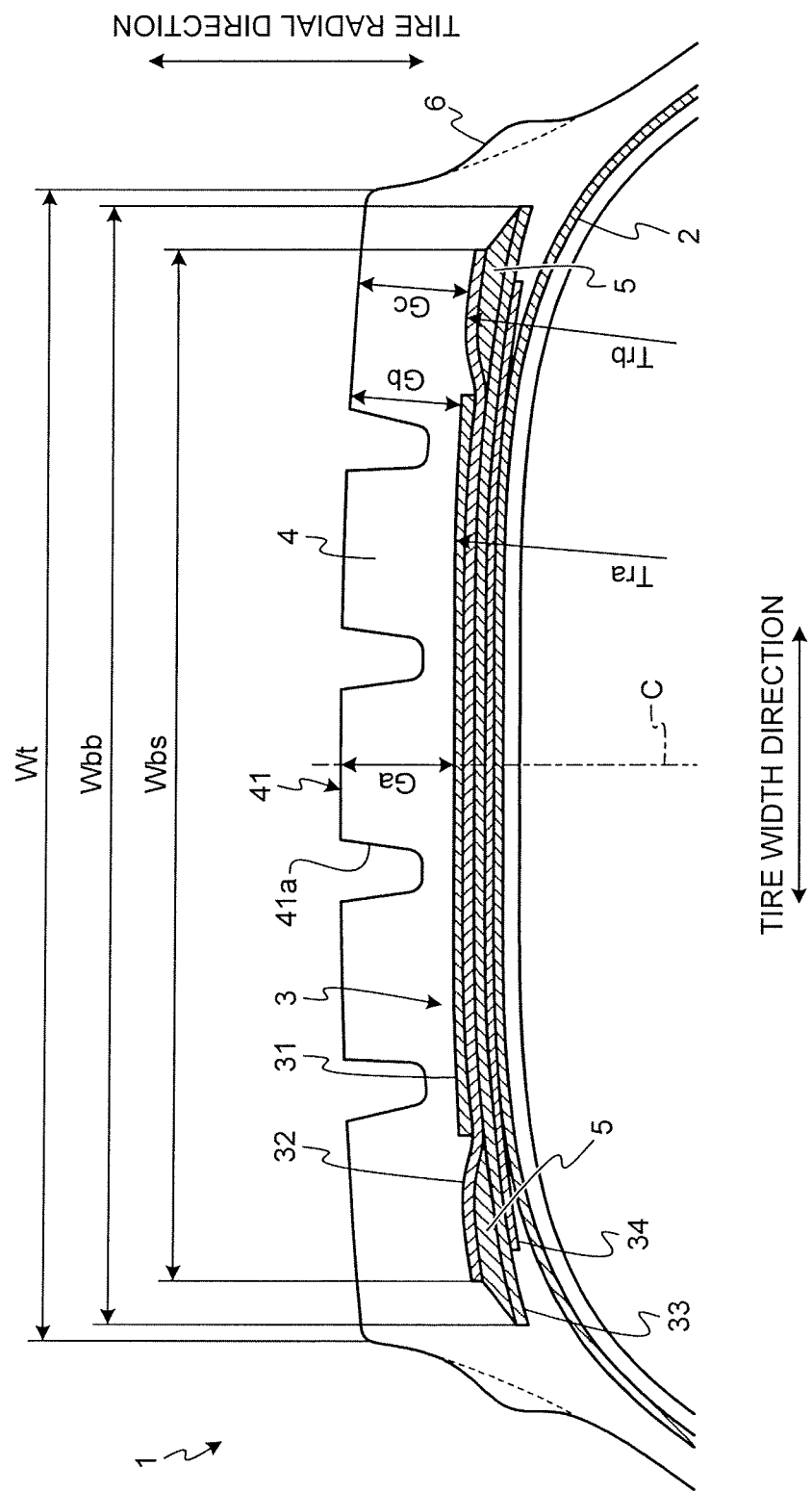
FIG. 1 is a meridian cross-sectional view representing a pneumatic tire according to an embodiment of the present invention.

1 Pneumatic tire
2 Carcass
3 Belt layer
31 First belt
32 Second belt
33 Third belt
34 Fourth belt
4 Tread
41 Tread surface
41*a* Circumferential direction main groove
5 Belt edge cushion
51 Wedge portion
52 Outer surface portion
53 Inner surface portion
6 Protrusion
C Tire equatorial line
Tra Curvature radius of first belt
Trb Curvature radius of portion of second belt curving to tire-radial-direction inner side
WB Width-direction dimension of inner surface portion of belt edge cushion
Wd Tire-width-direction distance between tire-width-direction outer end of first belt and tire-width-direction inner end of belt edge cushion
Ga Tire-radial-direction dimension of tread in tire equatorial position
Gb Tire-radial-direction dimension of tread in tire-width-direction outer end position of first belt
Gc Tire-radial-direction dimension of tread in tire-width-direction outer end position of second belt
Wbb Tire-width-direction dimension of third belt
Wbs Tire-width-direction dimension of second belt
Wt Tire-width-direction dimension of tread
W1 Distance from reference position to tire-width-direction inner side
W2 Distance from reference position to tire-width-direction outer side

BEST MODE(S) FOR CARRYING OUT THE INVENTION

An embodiment of a pneumatic tire according to the present invention is explained in detail below based on the drawings. The embodiment does not limit the present invention. The components of the embodiment include those replaceable or easily replaceable by those skilled in the art or those substantially equivalent. A plurality of modifications described in the embodiment can be arbitrarily combined within the scope obvious to those skilled in the art.

In the following explanation, a tire width direction refers to a direction parallel to the rotation axis of the pneumatic tire, a tire-width-direction inner side refers to a side toward the equatorial plane in the tire width direction, and a tire-width-direction outer side refers to a side away from the equatorial plane in the tire width direction. In addition, a tire radial direction refers to a direction orthogonal to the rotation axis, a tire-radial-direction inner side refers to a side toward the rotation axis in the tire radial direction, and a tire-radial-direction outer side refers to a side away from the rotation axis in the tire radial direction. In addition, the tire circumferential direction is a direction of a circumference around the center axis that is the rotation axis.

Figure 2:
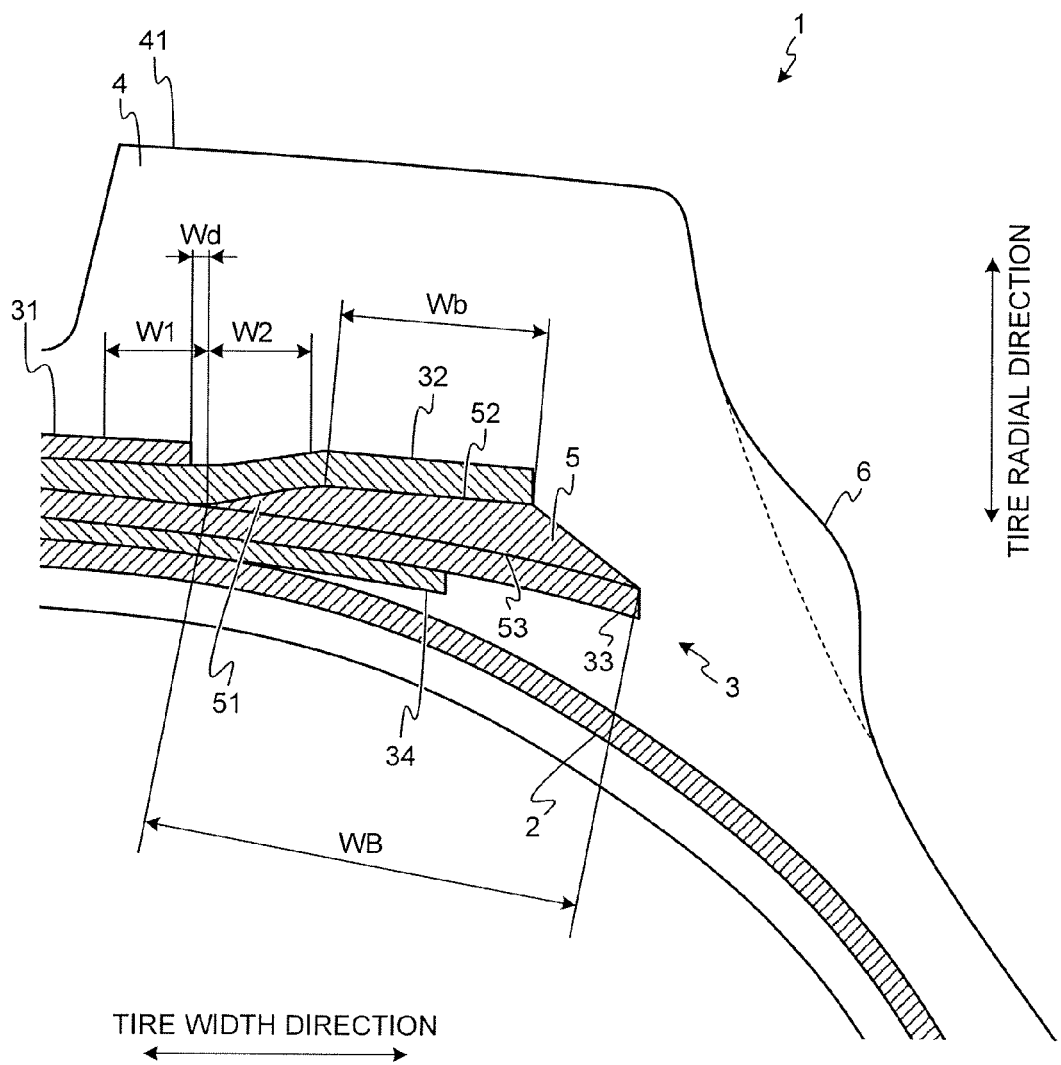
FIG. 2 is an enlarged view of a shoulder region of the pneumatic tire illustrated in FIG. 1.

FIG. 1 is a meridian cross-sectional view representing the pneumatic tire according to the embodiment of the present invention, and FIG. 2 is an enlarged view of a shoulder area of the pneumatic tire illustrated in FIG. 1. A pneumatic tire 1 according to the embodiment is a heavy-duty pneumatic radial tire, and is configured by including a carcass 2 and a belt layer 3. The carcass 2 is formed as it stretches across a pair of bead portions (not shown) in a toroidal shape, constituting a framework of the tire. The belt layer 3 is a four-layered structure formed by superposing a plurality of belts 31, 32, 33, and 34, and is arranged on the tire-radial-direction outer side of the carcass 2 to cover the carcass 2 in the tire circumferential direction. A rubber member is arranged on the tire-radial-direction outer side of the belt layer 3, so that a tread 4 is formed. The tread 4 is exposed to the outside of the pneumatic tire 1, and the surface of the tread 4 is formed as a tread surface 41 serving as the outline of the tread 4 and as a contact surface. On the tread surface 41, a circumferential direction main groove 41a continuously is formed in the tire circumferential direction.

In the belt layer 3, the first belt 31, the second belt 32, the third belt 33, and the fourth belt 34 are sequentially superposed in this order from the tire-radial-direction outer side to the tire-radial-direction inner side. In the belt layer 3, the fourth belt 34 arranged on the tire-radial-direction innermost side has a belt cord buried in the rubber member that is laid with an angle of, for example, 50 to 60 degrees with respect to tire circumferential direction, i.e., the tire equatorial line C. The third belt 33 that is on the outer side of the fourth belt 34 and is thirdly arranged from the tire-radial-direction outer side has a belt cord with an angle of, for example, 15 to 30 degrees with respect to the tire equatorial plane C in the same direction as that of the fourth belt 34. The second belt 32 that is on the outer side of the third belt 33 and is secondly arranged from the tire-radial-direction outer side has a belt cord oblique in the direction opposite to that of the third belt 33, with an angle of, for example, 15 to 30 degrees, with respect to the tire equatorial plane C. The first belt 31 that is on the outer side of the second belt 32 and is firstly arranged on the tire-radial-direction outer side has a belt cord oblique in the same direction as that of the second belt 32, with an angle of, for example, 15 to 30 degrees, with respect to the tire equatorial plane C. The belt layer 3 may be a three-layered structure of the first to third belts 31 to 33 without the fourth belt 34.

A belt edge cushion 5 interposes between a tire-width-direction outer end portion (a portion in a predetermined range from the end on the tire-width-direction outer side) of the second belt 32 and a tire-width-direction outer end portion of the third belt 33. The belt edge cushion 5 is made of a rubber member and reduces the shear deformation of the second belt 32 and the third belt 33 whose belt cords cross, and prevents the mutual tire-width-direction outer end portions from coming off. The belt edge cushion 5 of the embodiment is formed such that, in the area in the tire width direction, the tire-width-direction outer end portion of the second belt 32 and the tire-width-direction outer end portion of the third belt 33 are separated, and that the second belt 32 is curved to the tire-radial-direction inner side and the tire-radial-direction outer surface of the second belt 32 is parallel to the outline of the tread surface 41 in the shoulder area of the tread 4. The shoulder area of the tread 4 is the area of the tire-width-direction outer end portion of the tread 4, and is a portion in which the width-direction outer end portion of the belt layer 3 is positioned. The area of the center portion of the tread 4 including the tire equator is referred to as a center area As illustrated in FIG. 2, in the meridian cross-sectional view, the belt edge 5 cushion is formed by including an wedge portion 51 forming a corner in an acute angle with respect to the tire equator line C; an outer surface portion 52 that is continuous to the wedge portion 51 on the tire-radial-direction outer side, is along the tire-radial-direction inner surface of the second belt 32, and curves the second belt 32 the tire-radial-direction inner side; and an inner surface portion 53 that is continuous to the wedge portion 51 on the tire-radial-direction inner side is along the tire-radial-direction outer surface of the third belt 33. In other words, the wedge portion 51 gradually separates the tire-width-direction outer end portion of the second belt 32 and the tire-width-direction outer end portion of the third belt 33 toward the tire-width-direction outer side. The outer surface portion 52 and the inner surface portion 53 contact with the surfaces of the second belt 32 and the third belt 33, respectively, and the thickness between the outer surface portion 52 and the inner surface portion 53 curves the tire-width-direction outer end portion of the second belt 32 to the tire-radial-direction inner side in the position of the belt edge cushion, so that the tire-radial-direction outer surface of the tire-width-direction outer end portion of the second belt 32 is parallel to the outline of the tread surface 41 in the shoulder area.

The tire-width-direction outer end (the end on the tire-width-direction outer side) of the first belt 31 overlaps the tire-radial-direction outer surface of the tire-width-direction outer end portion of the second belt 32, and is provided in a position close to the tire-width-direction inner end (the tip of the wedge portion 51) of the belt edge cushion 5 in the tire-width-direction. Specifically, provided that the position of the tire-width-direction inner end of the belt edge cushion 5 in the tire width direction is set as a reference, it is most preferable that the tire-width-direction outer end of the first belt 31 be provided to coincide with the position in the tire width direction that is the reference position.

In the pneumatic tire 1 of the embodiment configured as described above, the second belt 32 is curved to the tire-radial-direction inner side in the area of the belt edge cushion 5 in the tire width direction and the tire-width-direction outer end of the first belt 31 arranged firstly from the tire-radial-direction outer side is provided in the position close to the tire-width-direction inner end of the belt edge cushion 5 in the tire width direction. Thus, in the tread 4, an aligned plane is achieved from the tire-radial-direction outer surface of the first belt 31 to the tire-radial-direction outer surface of the second belt 32, which equalize the thickness of the tread 4 in the tire radial direction. As a result, the contact pressure of the tread 4 is equalized, which improves the uneven wear resistance in the shoulder area and equalize the rigidity of the tread in the tire width direction. This improves the durability of the pneumatic tire 1 and the stability in steering in the case where the pneumatic tire 1 is mounted on the steering shaft.

The belt edge cushion 5 may be a quadrangle forming a nearly-quadrangle meridian cross section. In this case, it is preferable that a width-direction dimension Wb of the outer surface portion 52 that curves the tire-width-direction outer end portion of the second belt 32 to the tire-radial-direction inner side and a width-direction dimension WB of the inner surface portion 53 that forms an area of the belt edge cushion 5 in the tire width direction have a relationship of $0.35 \leq Wb/WB \leq 0.50$. The with direction dimension Wb of the outer surface portion 52 of the belt edge cushion 5 represents a width dimension (linear dimension in the width direction) of the belt edge cushion 5, and the width-direction dimension WB of the inner surface portion 53 represents the linear dimension of the inner surface portion 53 in the width direction.

When Wb/WB is less than 0.35, it is difficult to form the tire-circumferential-direction outer surface of the tire-width-direction outer end portion of the second belt 32 along the outline of the tread surface 41 in the shoulder area. When Wb/WB exceeds 0.50, it is difficult to assure an amount of a step in the tire width direction (an amount of extension of the tire-width-direction outer end of the third belt 33 from the tire-width-direction outer end of the second belt 32) between the tire-width-direction outer end portion of the second belt 32 and the tire-width-direction outer end portion of the third belt 33, which deteriorates the durability of the belt layer 3 and causes separation in the tire-width-direction end portion of the belt layer 3. In other words, by appropriately setting Wb/WB, the thickness of the tread 4 in the tire radial direction in the shoulder area is equalized and the belt edge cushion 5 that is optimum to improve the durability of the belt layer 3 can be obtained.

In the pneumatic tire 1 of the embodiment, as illustrated in FIG. 1, a curvature radius Trb of the portion of the second belt 32 curving to the tire-radial-direction inner side and a curvature radius Tra of the first belt 31 have a relationship of $0.03 \leq Trb/Tra \leq 0.20$.

In the pneumatic tire 1, the relationship between the curvature radius Trb of the portion of the second belt 32 curving to the tire-radial-direction inner side and the curvature radius Tra of the first belt 31 are defined, so that the thickness of the tread in the tire radial direction can be further equalized.

It is preferable in the pneumatic tire 1 of the embodiment that the position of the tire-width-direction outer end of the first belt 31 be provided such that, as illustrated in FIG. 2, a distance Wd from the position in the tire-width-direction inner end of the belt edge cushion 5 in the tire width direction to the tire-width-direction inner or outer side is in a range of $0 \leq Wd/WB \leq 0.30$, preferably in a range of $0 \leq Wd/WB \leq 0.15$, with respect to the width-direction dimension WB of the belt edge cushion 5. In other words, a position in the tire-width-direction inner end of the belt edge cushion 5 in the tire width direction is set as a reference, and the tire-width-direction end of the first belt 31 is provided in a range including a range W1 from the reference position to the tire-width-direction inner side, 0 to 30% (preferably 0 to 15%) of the width-direction dimension WB of the belt edge cushion 5, and a range W2 from the reference position to the tire-width-direction outer side, 0 to 30% (preferably 0 to 15%) of the width-direction dimension WB of the belt edge cushion 5. The position of the tire-width-direction outer end of the outer surface portion 52 of the belt edge cushion 5 may correspond to the position of the tire-width-direction outer end of the second belt 32, and the position of the tire-width-direction outer end of the belt edge cushion 5 may correspond to the position of the tire-width-direction outer end of the third belt 33.

When the tire-width-direction outer end of the first belt 31 is out of the range, 30% of the width-direction dimension WB of the belt edge cushion 5, from the reference position to the tire-width direction inner side, a distance W1 between the tire-width-direction outer end of the first belt 31 and the tire-width-direction inner end of the belt edge cushion 5 increases, which causes a step between the tire-radial-direction outer surface of the first belt 31 and the tire-radial-direction outer surface of the second belt 32. This makes it difficult to equalize the thickness of the tread 4 in the tire radial direction in the shoulder area. In addition, when the tire-width-direction outer end of the first belt 31 is out of the range, 30% of the width-direction dimension WB of the belt edge cushion 5, from the reference position to the tire-width-direction outer side, a distance W2 between the tire-width-direction outer end of the first belt 31 and the tire-width-direction inner end of the belt edge cushion 5 increases and the tire-width-direction outer end of the first belt 31 runs onto the tire radial direction outer surface of the second belt 32, which outer surface is formed by the belt edge cushion 5. This makes it difficult to equalize the thickness of the tread 4 in the tire radial direction in the shoulder area. In other words, by appropriately setting Wb/WB, the thickness of the tread 4 in the tire radial direction in the shoulder area is equalized. In addition, in the pneumatic tire 1 of the embodiment, as illustrated in FIG. 1, provided that a tire equatorial position is Ga, the tire-width-direction outer end position of the first belt is Gb, and the tire-width-direction outer end position of the second belt is Gc, the tire-radial-direction dimension of the tread 4 (the dimension in the normal direction of the tread 4 with respect to the tread surface 41: tread gage) is set in a range of $0.90 \leq Gc/Ga \leq 1.10$ and in a range of $0.90 \leq Gb/Gc \leq 0.97$.

According to the pneumatic tire 1, the thickness of the tread in the tire radial direction from the tire equatorial line of the tread to the shoulder area can be further equalized.

In the pneumatic tire 1 according to the embodiment, as illustrated in FIG. 1, a tire-width-direction dimension Wbs of the second belt 32, and the tire-width-direction dimension Wt of the tread 4 have a relationship of $0.87 \leq Wbs/Wt \leq 0.94$, and a tire-width-direction dimension Wbb of the third belt and a tire-width-direction dimension Wt of the tread 4 have a relationship of $0.93 \leq Wbb/Wt \leq 1.00$. As described above, by setting the tire-width-direction dimensions Wbs and Wbb of the second belt 32 and the third belt 33 larger as much as possible with respect to the tire-width-direction dimension Wt of the tread 4, the formability of the belt edge cushion 5 can be improved and the effective width of the belt layer 3 acting on the shoulder area can be sufficiently assured.

As described above, when the tire-width-direction dimensions Wbs and Wbb of the second belt 32 and the third belt 33 are set larger as much as possible with respect to the tire-width-direction dimension Wt of the tread 4, the thickness of the rubber member in the buttress portions positioned on both of the tire-width-direction ends of the tread 4 decreases, which may make it difficult to remold the pneumatic tire 1. For this reason, as illustrated in FIG. 2, it suffices that protrusions 6 that protrude to the tire-width-direction outer sides be provided on portions on the tire-width-direction extension line to increase the thickness in the buttress portions.

Although not specified in the drawings, in addition to the above-described configuration, a covering member made of a rubber member may be provided on the tire-width-direction outer end portions of the second belt 32 and the third belt 33. The covering member increases the rigidity of the tread 4 in the shoulder area.

EXAMPLE

FIG. 3 is a table of results of performance tests on pneumatic tires of examples of the present invention. The examples of the present invention are explained with reference to FIG. 3. Examples of the pneumatic tire 1 were made, and were carried out tests for evaluating three items of the performance of the pneumatic tire 1 and conventional pneumatic tires: uneven wear resistance in the shoulder area (Sh shoulder wear resistance), uneven wear resistance in the center area (center wear resistance), and separation resistance in the tire-width-direction outer end portion of the belt layer 3 (belt-edge-separation resistance).

In the performance tests, a pneumatic tire in a tire size of 295/80R22.5 was mounted on a regular rim, and the pneumatic tire was filled with an internal pressure of 900 kPa (regular internal pressure) and applied with a load of 35.79 kN (regular load). The regular rim is "Standard Rim" defined by JATMA, "Design Rim" defined ETRTO, or "Measuring Rim" defined ETRTO. The regular internal pressure is "MAXIMUM AIR PRESSURE" defined by JATMA, the maximum value of "TIRE LOAD LIMITS AT VARIOUS COLD INFLATION PRESSURES" defined by TRA, or "INFLATION PRESSURES" defined by ETRTO. The regular load is "MAXIMUM LOAD CAPACITY" defined by JATMA, the maximum value of "TIRE LOAD LIMITS AT VARIOUS COLD INFLATION PRESSURES" defined by TRA, or "LOAD CAPACITY" defined by ETRTO.

A tire is mounted on the steering shaft of a 5t–2·D4 vehicle and the vehicle travels 50,000 kilometers, comparison is thereafter made regarding the rest of the circumferential direction main groove 41a on the shoulder-area side, and the Sh shoulder wear resistance and the center wear resistance are indicated by indexes based on the conventional example of which evaluation results are 100%. The larger the index is, the more the Sh shoulder wear resistance is excellent, and an index that is 99% or more represents excellent center wear resistance. The belt-edge-separation resistance is indicated by an index based on the conventional example of which evaluation result is 100% on the basis of comparison on a distance traveled until the tire is broken in an indoor drum test. An index that is 98% or more represents excellent belt-edge-separation resistance.

In the example, as shown in FIG. 3, the conventional tire (conventional example) and 14 examples of the present invention undergo tests in the above-described manner. In the pneumatic tires represented by "Examples 1 to 14", the second belt is curved to the tire-radial-direction inner side in the area of the belt edge cushion in the tire width direction, and the tire-width-direction outer end of the first belt is provided in a position close to the tire-width-direction inner end of the belt edge cushion in the tire width direction. In the pneumatic tires of "Examples 1 to 8" from these tires, all of Trb/Tra, Wd/WB, Wbs/Wt, Wbb/Wt, Gc/Ga, and Gb/Gc are defined in an appropriate range. In the pneumatic tires represented by "Examples 9 and 10", ratios except for Trb/Tra are defined in an appropriate range. In the pneumatic tires represented by "Examples 11 and 12", ratios except for Wd/WB are defined in an appropriate range. In the pneumatic tires represented by "Examples 13 and 14", ratios except for Wbs/Wt, Wbb/Wt, Gc/Ga and Gb/Gc are defined in an appropriate range. In the conventional example, the cross-sectional shape of the belt edge cushion is triangular, i.e., wedge-shaped, and each range is not appropriately defined.

As it is clear from FIG. 3, the pneumatic tires represented by "Examples 1 to 14" maintains the uneven wear resistance (center wear resistance) in the center area and the separation resistance (belt-edge-separation resistance) in the tire-width-direction outer end portion of the belt layer 3, and improves the uneven wear resistance in the shoulder area (Sh shoulder wear resistance). In the pneumatic tires represented by "Examples 1 to 8" of which all ratios in an appropriate range, an effect of improvement especially in the uneven wear resistance in the shoulder area (Sh shoulder wear resistance) is large.

Industrial Applicability

As described above, the pneumatic tire according to the present invention is suitable for further improving the uneven wear resistance of the tread in the shoulder area and equalizing the rigidity of the tread in the tire-width direction.

The invention claimed is:

1. A pneumatic tire comprising:
   at least three belts arranged on a tire-radial-direction outer side of a carcass; and
   a belt edge cushion arranged between a tire-width-direction outer end portion of a second belt that is secondly arranged from the tire-radial-direction outer side and a tire-width-direction outer end portion of a third belt that is thirdly arranged, wherein
   an inner part of the tire-width-direction outer end portion of the second belt curves radially inwardly toward the third belt in the position of the belt edge cushion,
   a tire-width direction outer end of a first belt that is firstly arranged from the tire-radial-direction outer side is provided in a position close to a tire-width-direction inner end of the belt edge cushion in the tire width direction such that a tire-width direction distance Wd between the tire-width direction outer end of the first belt and the tire-width direction inner end of the belt edge cushion is in a range of $0<Wd/WB<0.30$ of a width direction WB of the belt edge cushion, and
   a curvature radius Trb of a portion of the second belt, which portion curves to the tire-radial-direction inner side, and a curvature radius Tra of the first belt have a relationship of $0.03<Trb/Tra<0.20$.

2. The pneumatic tire according to claim 1, wherein, provided that a tread radial dimension at a tire equator position is Ga, a tread radial dimension at a tire-width direction outer end position of the first belt is Gb, and a tread radial dimension at a tire-width-direction outer end position of the second belt is Gc, a tire-radial-direction dimension of the tread is set in a range of $0.90<Gc/Ga<1.10$ and a range of $0.90<Gb/Gc<0.97$.

3. The pneumatic tire according to claim 1, wherein
   a tire-width-direction dimension Wbs of the second belt and a tire-width-direction dimension Wt of the tread have a relationship of $0.87<Wbs/Wt<0.94$, and
   a tire-width-direction dimension Wbb of the third belt and a tire-width-direction dimension Wt of the tread have a relationship of $0.93<Wbb/Wt<1.00$.

4. The pneumatic tire according to claim 1, wherein protrusions that protrude to the tire-width-direction outer side are provided in portions that are buttress portions positioned on both of tire-width direction ends of the tread to facilitate remolding of the tire, and to which at least tire-width-direction outer ends of the third belt direct.

5. The pneumatic tire according to claim 1, wherein the belt edge cushion is a rubber member which completely fills a space between the tire-width-direction outer end portions of the second and third belts.

6. The pneumatic tire according to claim 1, wherein the belt edge cushion has a wedge shape such that it gradually separates the tire-width-direction outer end portions of the second and third belts toward the tire width direction outer side.

7. The pneumatic tire according to claim 1, further comprising a tread having a plurality of main grooves extending in a circumferential direction of the tire, and a tire-width-direction outer end of a first belt that is firstly arranged from the tire-radial-direction outer side is disposed outwardly in the tire width direction of an outermost one of the circumferentially extending main grooves in the tire width direction.

8. The pneumatic tire according to claim 4, wherein the protrusions have rounded outer surfaces and extend from a level outwardly of an outermost one of the belts in the tire-radial-direction to a level radially inwardly of an innermost one of the belts in the tire-radial-direction.

* * * * *